United States Patent [19]
Matsumoto et al.

[11] Patent Number: 5,783,132
[45] Date of Patent: Jul. 21, 1998

[54] PROCESS FOR PRODUCING A FIBER-REINFORCED THERMOPLASTIC RESIN MOLDED ARTICLE

[75] Inventors: Masahito Matsumoto, Ibaraki; Takeo Kitayama, Takatsuki; Satoru Funakoshi, Osaka, all of Japan

[73] Assignee: Sumitomo Chemical Company, Limited, Osaka, Japan

[21] Appl. No.: 490,629

[22] Filed: Jun. 15, 1995

[30] Foreign Application Priority Data

Jun. 15, 1994 [JP] Japan .................. 6-133093

[51] Int. Cl.$^6$ ............................. B29C 33/12
[52] U.S. Cl. ............ 264/257; 214/322; 214/324; 214/258; 214/266; 425/521; 425/400; 425/509; 156/222
[58] Field of Search ............... 264/257, 322, 264/324, 258, 266; 425/521, 400, 509; 156/222

[56] References Cited

U.S. PATENT DOCUMENTS

| | | | |
|---|---|---|---|
| 1,354,734 | 10/1920 | Ferguson | 264/257 |
| 2,797,179 | 6/1957 | Reynolds et al. | 154/110 |
| 2,985,919 | 5/1961 | Borroff et al. | 425/400 |
| 2,985,920 | 5/1961 | Borroff et al. | 425/400 |
| 4,075,266 | 2/1978 | Theysohn | 264/322 |
| 4,201,612 | 5/1980 | Figge et al. | 264/257 |
| 4,304,751 | 12/1981 | Li et al. | |
| 4,360,491 | 11/1982 | Holem, Jr. | 264/322 |
| 4,390,489 | 6/1983 | Segal | |
| 4,432,716 | 2/1984 | Kiss | |
| 4,489,031 | 12/1984 | Ogihara | |
| 4,555,086 | 11/1985 | Kiyotomo | 249/67 |
| 5,044,918 | 9/1991 | Brussel | 425/400 |
| 5,053,179 | 10/1991 | Masui et al. | 264/257 |
| 5,277,865 | 1/1994 | Hara et al. | |

FOREIGN PATENT DOCUMENTS

| | | | |
|---|---|---|---|
| 0 335 098 | 10/1989 | European Pat. Off. | |
| 2 521 904 | 8/1983 | France | |
| 2149407 | 7/1987 | Japan | 264/257 |
| B64-10167 | 2/1989 | Japan | |
| A-4223160 | 8/1992 | Japan | |

*Primary Examiner*—Jan H. Silbaugh
*Assistant Examiner*—Robin S. Gray
*Attorney, Agent, or Firm*—Pillsbury, Madison & Sutro LLP; Cushman Darby & Cushman Intellectual Property Group

[57] ABSTRACT

A process for producing a fiber-reinforced thermoplastic resin molded article including: (a) projecting a sheet-holding member from a cavity face of a lower mold towards a cavity face of an upper mold, (b) placing a heated fiber-reinforced thermoplastic resin sheet on the sheet-holding member, (c) closing the upper and lower molds, (d) in the step of closing the upper and lower molds, putting the sheet-holding member into the lower mold before the cavity face of the upper mold contacts with the resin sheet, (e) maintaining the upper and lower molds in a closed state, and (f) opening the upper and lower molds and removing the molded article. A fiber-reinforced thermoplastic resin molded article which has a good surface appearance and, if any, whose protrusions such as ribs and bosses are sufficiently filled with thermoplastic resin and reinforcing fibers, can be produced, without using an additional thermoplastic resin sheet and without repeating the molding process.

8 Claims, 7 Drawing Sheets

PROCESS FOR PRODUCING A FIBER-REINFORCED THERMOPLASTIC RESIN MOLDED ARTICLE

BACKGROUND OF THE INVENTION

1. Field of the Invention

The present invention relates to a process for producing fiber-reinforced thermoplastic resin molded articles and a sheet stamping mold (mold assembly) used therefor.

2. Related Background Art

Fiber-reinforced thermoplastic resin molded articles being light in weight and having protrusions such as ribs and bosses have been well known, and as processes for producing the same, the following so-called sheet stamping process has been known. The sheet stamping process comprises heating a fiber-reinforced thermoplastic resin sheet and press molding the sheet by a pair of molds having a cavity of a given shape. Such a fiber-reinforced thermoplastic resin sheet includes a sheet obtained by so-called laminate method which comprises thrusting a needle into a plurality of strand-like reinforcing fiber bundles to make a mat-like strand reinforcing fibers comprising intertwined fibers, laminating these mat-like reinforcing fibers with a thermoplastic resin and then heating and pressing them; and a sheet obtained by so-called paper-making method which comprises uniformly dispersing reinforcing fibers of 3–30 μm in diameter and 3–50 μm in length and thermoplastic resin powders in an aqueous solution, subjecting the dispersion to so-called paper-making process to obtain a nonwoven material and then heating and pressing the material.

In order to improve the appearance of fiber-reinforced thermoplastic resin molded articles, a method has been proposed which comprises laminating an additional thermoplastic resin sheet on the surface of a fiber-reinforced thermoplastic resin sheet softened by heating and then press molding the laminate (Japanese Patent Laid-Open No. 223160/1992).

Further, as a process for filling thermoplastic resin and reinforcing fibers in the protrusions, such as ribs and bosses, of fiber-reinforced thermoplastic resin molded articles, a process has been proposed which comprises putting on a recession of a mold corresponding to the protrusion a fiber-reinforced thermoplastic resin sheet softened by heating and in an amount sufficient to fill the recession, press molding the sheet to previously fill the recession of the mold with thermoplastic resin and reinforcing fibers, and then again putting another fiber-reinforced thermoplastic resin sheet softened by heating on the face of the mold, followed by carrying out press molding again to integrate the latter softened resin sheet with the previously formed resin sheet in the recession (Japanese Patent Publication (Kokoku) No.10167/1989 (corresponding to Japanese Patent Laid-Open No.18319/1985)).

SUMMARY OF THE INVENTION

The inventors have found that the conventional processes have the following problems. That is, the process described in Japanese Patent Laid-Open No.223160/1992 has the problems that it requires an step of putting and laminating an additional thermoplastic resin sheet at the time of molding and besides the sheets usable are restricted.

The process described in Japanese Patent Publication (Kokoku) No.10167/1989 has the practically serious problem that molding must be carried out twice and this causes prolongation of the molding cycle.

An object of the present invention is to provide a process for producing a fiber-reinforced thermoplastic resin molded article which has a good surface appearance and, if any, whose protrusions such as ribs and bosses are sufficiently filled with thermoplastic resin and reinforcing fibers, without using an additional thermoplastic resin sheet and without repeating the molding process, namely, by one molding.

Another object of the present invention is to provide a sheet stamping mold (mold assembly) used for the process of the present invention.

The present invention provides a process for producing a fiber-reinforced thermoplastic resin molded article, which comprises the following steps of:

(a) projecting at least one sheet-holding member (for example, a plurality of sheet-holding pins) provided in a lower mold of a pair of upper and lower molds (top and bottom molds) from a cavity face of the lower mold towards a cavity face of the upper mold, said upper and lower molds being in an open state, (b) placing a heated fiber-reinforced thermoplastic resin sheet on the sheet-holding member in such a manner that the sheet does not contact with the cavity face of the lower mold, (c) closing the upper and lower molds, (d) in the said step of closing the upper and lower molds, putting (returning) the sheet-holding member into the lower mold to lower down the resin sheet onto the cavity face of the lower mold before the cavity face of the upper mold contacts with the resin sheet, (e) cooling and solidifying the resin sheet while maintaining the upper and lower molds in a closed state, and (f) opening the upper and lower molds and removing the resulting molded article.

The sheet-holding member is preferably projected from the cavity face of the lower mold so that the tip of the member is projected at a distance of 3–15 mm from the cavity face of the lower mold. Further, it is preferred that when the distance between the cavity face of the upper mold and the upper surface of the resin sheet reaches 0.1–50 mm, the sheet-holding member is put into the lower mold at a speed higher than the speed of closing the upper and lower molds.

One aspect of the process of the present invention further comprises a step of providing a skin material between the upper mold and the fiber-reinforced thermoplastic resin sheet before closing the upper and lower molds. In this case, it is preferred that when the distance between the under side surface of the skin material and the upper side surface of the resin sheet reaches 0.1–50 mm, the sheet-holding member is put into the lower mold.

Another aspect of the process of the present invention further comprises a step of again projecting the sheet-holding member from the cavity face of the lower mold towards the cavity face of the upper mold to release the resulting molded article from the cavity face of the lower mold, after opening the upper and lower molds.

In the process of the present invention, since the heated and softened fiber-reinforced thermoplastic resin sheet can be molded by the upper and lower molds immediately after placed on the cavity face of the lower mold, the surface of the resin sheet does not solidify before being molded. Therefore, the reinforcing fibers which appear on the surface of the sheet when the fiber-reinforced thermoplastic resin sheet is heated to a temperature higher than the melting point of the resin are covered with the resin which maintains its fluidity in the step of press molding the resin sheet and, as a result, the reinforcing fibers do not appear (are not exposed) on the surface of the resulting molded article.

Therefore, according to the process of the present invention, the reinforcing fibers do not remain on the surface of the resulting molded article, causing no bad surface appearance. Thus, it becomes possible to produce easily and efficiently a fiber-reinforced thermoplastic resin molded article having no exposed reinforcing fibers on the surface and excellent in surface appearance, without using an additional thermoplastic resin sheet for improvement of appearance and without repeating the molding process a plurality of times, namely, by one molding.

Further, even when a recession corresponding to a protrusion of the desired molded article is provided at the cavity face of the mold, according to the present invention, the thermoplastic resin and the reinforcing fibers can be sufficiently and uniformly filled in the recession because the resin sheet is press molded before the resin surface solidifies on the face of the mold and the fluidity of the resin sheet lowers.

Therefore, according to the process of the present invention, by sufficiently and uniformly filling the reinforcing fibers and the resin in the protrusions by one molding process, it becomes possible to produce easily and efficiently a fiber-reinforced thermoplastic resin molded article having ribs and bosses which are excellent in shape and strength, without causing formation of incomplete shape or reduction of strength of protrusions of the molded article due to insufficient filling of the fibers and resin.

The present invention provides a sheet stamping mold (mold assembly) used for the process of the present invention, which comprises:

an upper mold having a cavity face, a lower mold having a cavity face opposing the cavity face of the upper mold and having at least one hole communicating to the cavity face of the lower mold, at least one sheet-holding member (for example, solid sheet-holding pin) which is received in the hole of the lower mold, and a driving device for the sheet-holding member, which moves the sheet-holding member between a first position where the sheet-holding member is completely put in the lower mold and a second position where a part of the sheet-holding member is projected from the cavity face of the lower mold.

The sheet-holding member preferably has a top or upper face which is substantially parallel to the cavity face of the lower mold.

One aspect of the mold of the present invention further comprises a pressing device which is connected to the upper and lower molds and which moves at least one of the upper and lower molds between one position where the upper and lower molds are in a closed state and another position where the upper and lower molds are in an open state.

Another aspect of the mold of the present invention further comprises a controlling device which is connected to the driving device for the sheet-holding member and the pressing device and which moves the sheet-holding member from the second position to the first position before the upper and lower molds come to the closed state in a step of closing the upper and lower molds.

By using the mold of the present invention, the process of the present invention can be simply and efficiently performed.

The above-mentioned "open state" means a state where the cavity clearance between the cavity face of the lower mold and the cavity face of the upper mold is greater than the thickness of the desired article (fiber-reinforced thermoplastic resin molded article).

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The present invention will be explained in detail referring to the accompanying drawings. The same or corresponding portions are indicated by the same reference numerals in the drawings.

First, the sheet stamping mold (mold assembly) of the present invention will be explained.

Figure 1:
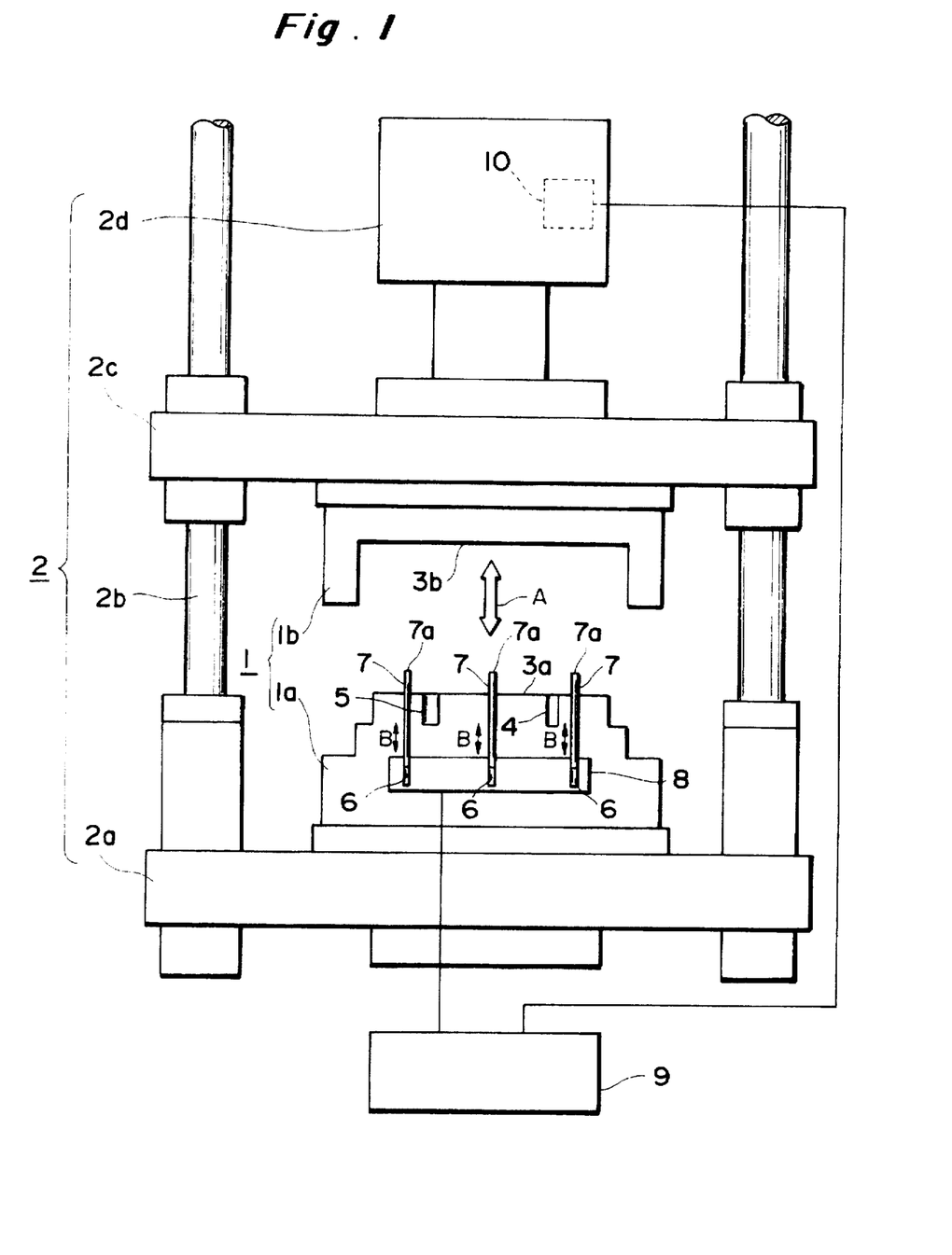
FIG. 1 is a schematic sectional view of one example of a sheet stamping mold (mold assembly) of the present invention.

The sheet stamping mold (mold assembly) 1 of the present invention comprise a pair of lower mold 1a and upper mold 1b as shown in FIG. 1 and these molds are fitted to pressing device 2. In FIG. 1, the lower mold (bottom mold) 1a is fixed to fixed frame 2a of the pressing device 2 (the lower mold 1a being a fixed mold). The upper mold (top mold) 1b is fixed to a movable frame 2c connected to the fixed frame 2a through connecting rod 2b (the upper mold 1b being a movable mold). A driving device 2d for the upper mold 1b is connected to movable frame 2c and the upper mold 1b is movable in the direction of A (double ended arrow A) in FIG. 1. That is, the upper mold 1b is movable between one position where the upper mold 1b and the lower mold 1a are in a closed state and another position where they are in an open state by the pressing device 2. The lower and upper molds 1a, 1b shown in FIG. 1 are in the open state. The lower mold may be a movable mold and the upper mold may be a fixed mold or both the molds may be movable molds.

The lower mold 1a and the upper mold 1b have cavity faces 3a and 3b respectively which are in conformity with the shape of a desired article and are opposed to each other. The cavity faces 3a and 3b will define a cavity space which is in conformity with the outer shape of the desired molded article when the lower mold 1a and the upper mold 1b are closed. In the lower mold 1a shown in FIGS. 1 and 2, there are provided recessions 4, 5 corresponding to the protrusions of the desired molded article such as rib and boss.

Holes 6 communicating to the cavity face 3a are formed in this lower mold 1a, and a sheet-holding member (sheet-holding pin) 7 is received or contained in each of the holes 6. The lower end of each of the sheet-holding pins 7 is connected to driving device 8 provided in the lower mold 1a. The sheet-holding pins 7 are movable (slidable) in the up and down direction B (the direction B substantially parallel to the direction A of opening and closing of the molds) in FIG. 1. That is, each of the sheet-holding pins 7 is movable between the first position where the sheet-holding pin 7 is completely put or buried in the lower mold 1a and the second position where a part (upper end portion) of the sheet-holding pin 7 is projected from the cavity face 3a. The sheet-holding pins 7 shown in FIG. 1 are at the second position. When the sheet-holding pins 7 are at the second position, the upper end 7a of each of the sheet-holding pins 7 is projected preferably about 3–15 mm from the cavity face 3a. When the sheet-holding pins 7 are at the first position, it is preferred that the cavity face 3a and the upper end faces 7a of the sheet-holding pins 7 are on the same level to form a smooth cavity face. It is also preferred that the diameter of the sheet-holding pin 7 and that of the hole 6 is substantially the same so that there is formed substantially no space between the side face (sliding face) of the sheet-holding pin 7 and the inner wall surface (sliding face) of the hole 6 in the lower mold 1a.

Further, a controlling device 9 is connected to the driving device 8 for the sheet-holding pin 7 and the driving device 2d for the pressing device 2 to control these devices. The sheet-holding pins 7 are controlled by the controlling device 9 so that they move (lower) from the second position to the first position before the lower and upper molds 1a, 1b become in the closed state, in the step of closing the lower and upper molds 1a, 1b. In this case, it is preferred to control so that the sheet-holding pins 7 are lowered upon sensing that the upper mold 1b reaches at a predetermined position in respect to the lower mold 1a. In the mold assembly shown in FIG. 1, a position sensor 10 for the upper mold 1b is provided at the driving device 2d for the pressing device 2 and is connected to the controlling device 9. The position sensor 10 is not especially limited and, for example, there may be used one which mechanically or optically senses the position of the upper mold 1b. The position sensor 10 may be provided outside the pressing device 2 (for example, by the side of upper mold 1b).

The driving device 8 for sheet-holding pins 7 is not especially limited, and it may be of simple structure as far as it can control the sliding speed (moving speed) of pin 7. For example, there may be used a driving device which utilizes air pressure or hydraulic pressure or an electromagnetic driving device. Further, the driving device 2d for the upper mold 1b is not particularly limited, and, for example, there may be used a driving device which utilizes hydraulic pressure.

The sheet-holding member 7 according to the present invention is used as a member on which a fiber-reinforced thermoplastic resin sheet softened by heating is placed and/or for pushing out the resulting molded article from the lower mold after completion of the molding as explained hereinafter, and, as far as it has such functions, its shape and the like is not particularly limited. As the sheet-holding member 7, rod-like sheet-holding pins having a sectional shape of polygon such as square or rectangle, curved face such as circle or oval, or free curved face may be exemplified, but a columnar sheet-holding pin having a circular and solid section as shown in FIG. 1 is preferred from the processing and operating aspects. Furthermore, it is preferred that the sheet-holding member 7 has an upper face substantially parallel to the cavity face 3a in order that when the sheet-holding member 7 is at the first position, the top end face 7a forms one plane surface together with the cavity face 3a.

The thickness of the sheet-holding member 7 is suitably selected depending on the conditions such as size of the desired molded article, state of arrangement thereof, and kind and thickness of the fiber-reinforced thermoplastic resin sheet used, and the thickness may be such as necessary to support the softened fiber-reinforced thermoplastic resin sheet and/or elevate the molded article from the cavity face of mold after completion of molding. For example, as for a sheet-holding pin made of a steel material, the diameter thereof may be usually 0.5–10 mm.

The number and arrangement of the sheet-holding member 7 are not particularly limited and are suitably determined depending on size and shape of the desired molded article and kind and thickness of the fiber-reinforced thermoplastic resin sheet used. In view of the purpose of supporting the heated and softened fiber-reinforced thermoplastic resin sheet, the number of the sheet-holding member 7 is preferably at least two and generally at least three. Moreover, it is necessary to arrange the sheet-holding members 7 so that when the softened fiber-reinforced thermoplastic resin sheet is placed thereon, the sheet does not contact with the cavity face 3a due to sag of the sheet between the sheet-holding members 7.

The lower mold 1a shown in FIG. 1 is a so-called male mold having cavity face 3a in the form of convex and the upper mold 1b is a so-called female mold having cavity 3b in the form of concave, but the upper mold may be a male mold and the lower mold may be a female mold.

Next, the process of the present invention for producing a fiber-reinforced thermoplastic resin molded article using the sheet stamping mold (mold assembly) of the present invention will be explained referring to FIGS. 3–8.

Figures 3A, 3B:
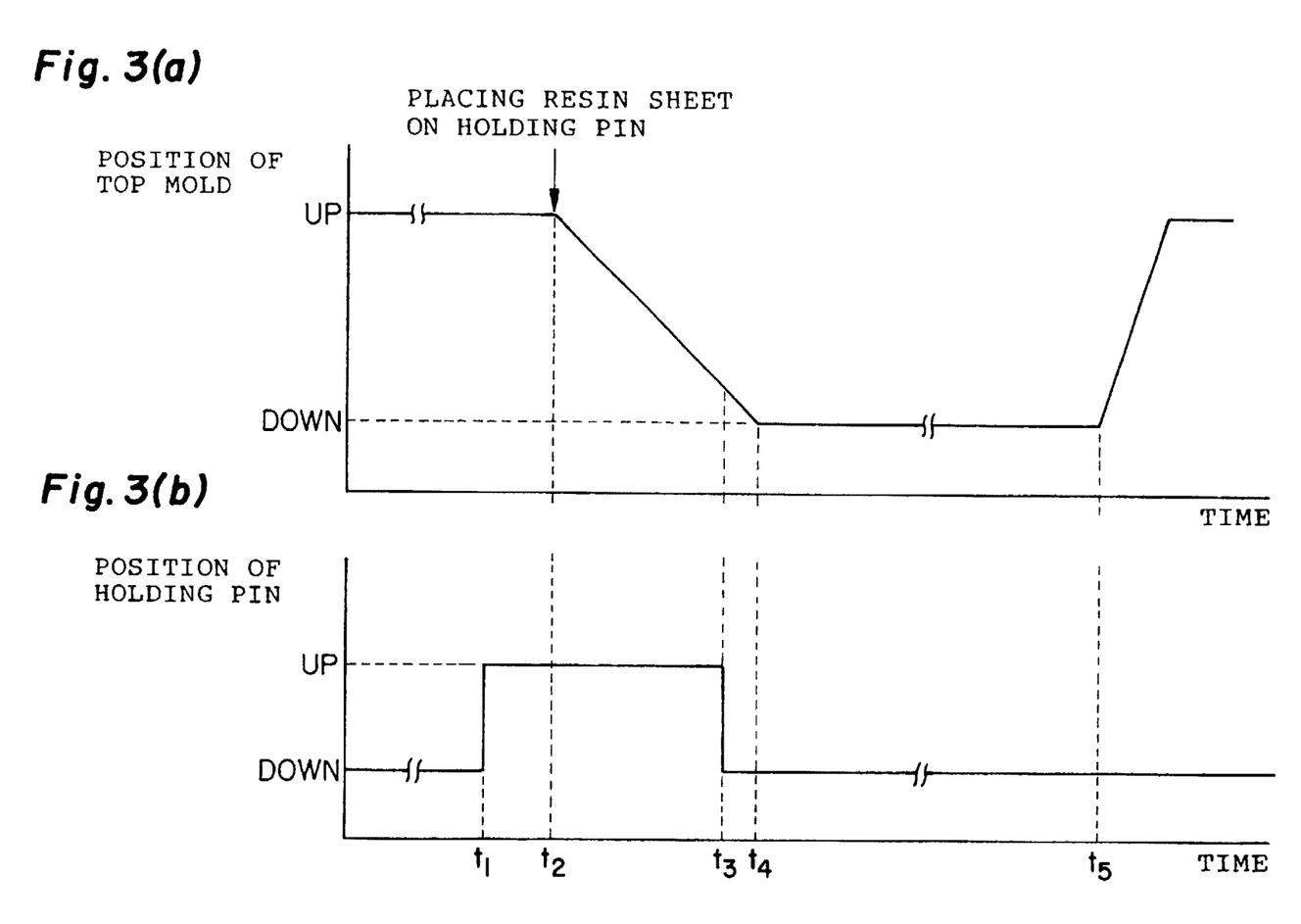
FIG. 3 is a timing chart which shows the working of the upper mold and the sheet-holding pins in one example of the process of the present invention.
Figure 4:
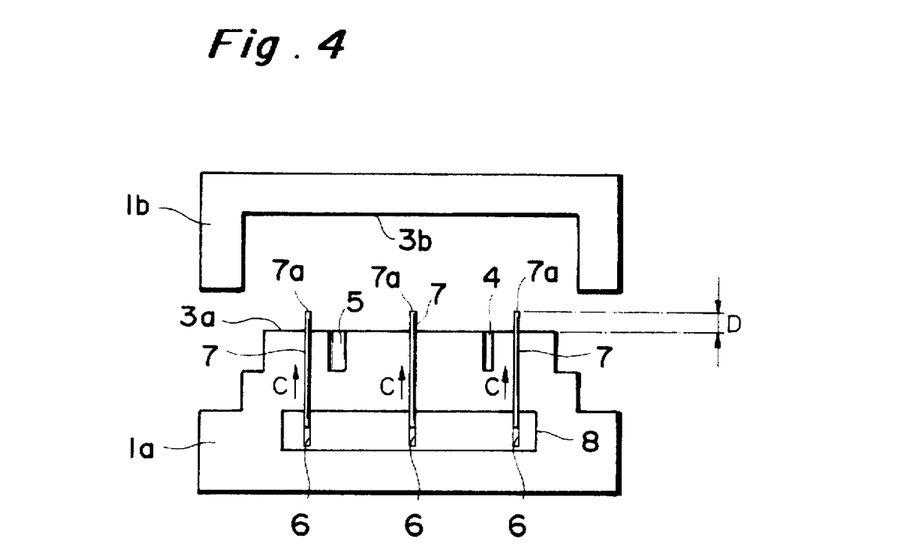
FIGS. 4, 5, 7 and 8 are schematic sectional views which show the state in each step of the process of the present invention for producing a fiber-reinforced thermoplastic resin molded article using the mold shown in FIG. 1.

First, in the open state when the upper mold 1b is at the position UP in FIG. 3, as shown in FIG. 4, the sheet-holding pins 7 stored in the lower mold 1a are projected from the cavity face 3a of the lower mold 1a into cavity towards the cavity face 3b of the upper mold 1b (in the direction of C in FIG. 4) by working the driving device 8 ($t_1$ in FIG. 3). The length of projection of sheet-holding pin 7 (distance D between the upper end 7a of the sheet-holding pin 7 and the cavity face 3a) is suitably selected depending on the kind of the resin sheet used and the like in such a manner that when the fiber-reinforced thermoplastic resin sheet softened by heating is held on the upper end 7a of each pin 7, the sheet does not contact with the cavity face 3a due to sag thereof between the pins 7 while the distance between cavity face 3a and the sheet is not too great. The distance of the projection is preferably about 3–15 mm.

Figure 5:
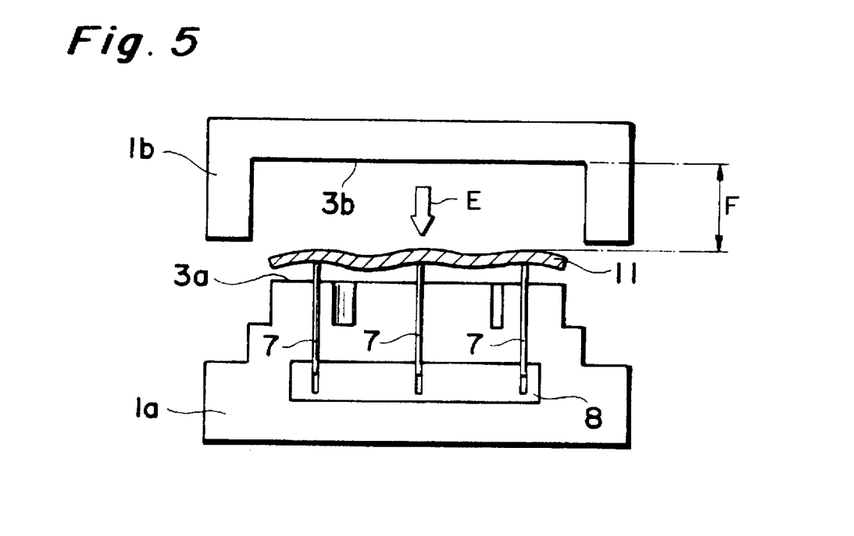

Then, the fiber-reinforced thermoplastic resin sheet 11 which is previously heated and softened by an oven or the like to give sufficient fluidity without causing heat deterioration is placed and held on the sheet-holding pins 7 in such a manner that the sheet 11 does not contact with the cavity face 3a of the lower mold 1a (shown in FIG. 5).

Preheating temperature of the resin sheet 11 is preferably higher than the melting point of the resin used and is suitably selected so as to avoid occurrence of the case where sufficient fluidity cannot be obtained by employment of too low preheating temperature or operation becomes difficult due to heat deterioration caused by employment of too high preheating temperature. The preheating temperature varies depending on the kind of the reinforcing fibers and the thermoplastic resin which constitute the fiber-reinforced thermoplastic resin sheet, but, in a case where the representative fiber-reinforced thermoplastic resin sheet comprising glass fibers as the reinforcing fibers and polypropylene as the thermoplastic resin is used, it may be usually in the range of 180°–250° C.

As the fiber-reinforced thermoplastic resin sheet used in the process of the present invention as a raw material, there may be used known sheets made by so-called laminate method or so-called paper-making method as they are, but when the desired fiber-reinforced thermoplastic resin molded articles have protrusions such as ribs and bosses, it is preferred to use a fiber-reinforced thermoplastic resin sheet made by the latter method.

The reinforcing fibers used in the fiber-reinforced thermoplastic resin sheets according to the present invention include inorganic fibers such as glass fibers, carbon fibers, alumina fibers and metallic fibers (e.g., stainless steel fibers); organic fibers such as aramid fibers; and mixtures thereof. Generally, glass fibers which are inexpensive and can give high reinforcing effect are preferred, and especially preferred are those which have an average fiber diameter of 1–50 μm and an average fiber length of at least 5 mm. As the matrix resins, there may be used any thermoplastic resins ordinarily used for extrusion molding, injection molding, press molding, etc., and examples thereof are general thermoplastic resins such as polyethylene, polypropylene, polystyrene, polyacrylonitrile, styrene-butadiene copolymer, polyvinyl chloride, polyamide, polycarbonate, polyethylene terephthalate, polybutylene terephthalate, polyphenylene ether, and styrene-acrylonitrile copolymer; thermoplastic elastomers such as ethylene-propylene copolymer and ethylene-propylenediene copolymer; mixtures thereof; and various polymer alloys thereof.

Figure 6:
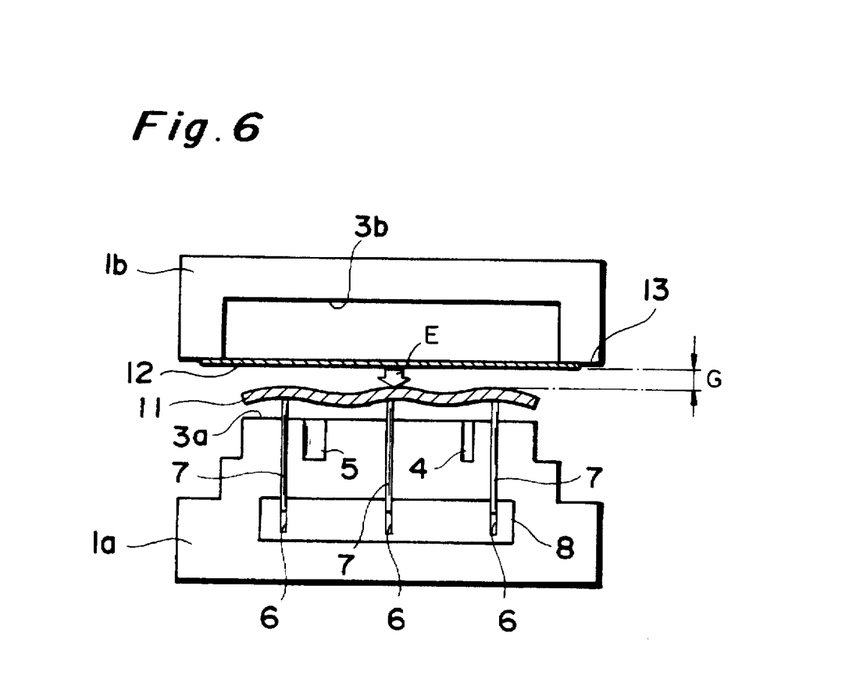
FIG. 6 is a schematic sectional view which shows the state in one of the steps of the process of the present invention for producing a fiber-reinforced thermoplastic resin molded article having a skin material using the mold shown in FIG. 1.

According to the present invention, it is also possible to produce a fiber-reinforced thermoplastic resin molded article having a skin material 12. In this case, the skin material 12 is provided between the upper mold 1b and the fiber-reinforced thermoplastic resin sheet 11 before the lower and upper molds 1a, 1b are closed. Specifically, before or after the softened fiber-reinforced thermoplastic resin sheet 11 is placed on the sheet-holding pins 7, the skin material 12 may be put on the resin sheet 11 or the skin material 12 may be previously fixed and held on a parting face 13 of the upper mold 1b as shown in FIG. 6. The latter method is preferred in order to prevent the skin material 12 from being damaged by heat. The parting face 13 is formed around the cavity face 3b and at least a part of the parting face 13 holds the skin material 12 together with the lower mold 1a when the lower and upper molds 1a, 1b are closed.

The skin material 12 is optionally selected depending on the purposes such as surface decoration of the desired molded articles and impartation of cushioning properties or heat insulation to the desired molded articles, but the skin material must have a heat resistance to such an extent as not being molten or broken by the heat of the heated and softened fiber-reinforced thermoplastic resin sheet. The skin materials are exemplified by paper; nonwoven fabric; sheet, foamed sheet, film or foamed film of thermoplastic resins; sheet, foamed sheet, film or foamed film of thermoplastic elastomers; and laminates comprising a combination thereof. The surface of the skin material 12 may be decorated with uneven patterns (such as grain patterns), printing, and the like.

Further, thickness of the skin material 12 varies depending on the kind of the material and the purpose of use, but may be usually about 0.5–4 mm.

As shown in FIG. 5, after the heated and softened fiber-reinforced thermoplastic resin sheet 11 is put on the sheet-holding pins 7, lowering of upper mold 1b in the direction of E in FIG. 5 (mold closing) is started by working the mold driving device 2d ($t_2$ in FIG. 3). In the step of closing the upper mold 1b, before, preferably just before, the cavity face 3b of the upper mold 1b contacts with the resin sheet 11, the sheet-holding pins 7 are completely put in the lower mold 1a (arrow H in FIG. 7) by working the driving device 8 ($t_3$ in FIG. 3) to lower down the resin sheet 11 onto the cavity face 3a of the lower mold 1a (shown in FIG. 7). The "just before the cavity face 3b of the upper mold 1b contacts with the resin sheet 11" here means such a state that the distance between the cavity face 3b of the upper mold 1b and the resin sheet 11 (F shown in FIG. 5) is generally 0.1–50 mm, preferably 0.1–30 mm, especially preferably 0.1–15 mm. When the distance between the cavity face 3b and the resin sheet 11 is not uniform as a whole, the distance between the portions of the cavity face 3b and the resin sheet 11 which are at the closest position is employed as a standard.

When the skin material 12 is previously fixed on the parting face 13 of the upper mold 1b as shown in FIG. 6, after the heated and softened fiber-reinforced thermoplastic resin sheet 11 is put on the sheet-holding pins 7, the mold driving device 2d is worked to start lowering of the upper mold 1b (mold closing) in the direction of E in FIG. 6 ($t_2$ in FIG. 3). In the step of closing the upper mold 1b, before, preferably just before, the skin material 12 contacts with the resin sheet 11, the sheet-holding pins 7 are completely put in the lower mold 1a by working the driving device 8 ($t_3$ in FIG. 3) to lower down the resin sheet 11 onto the cavity face 3a. The "just before the skin material 12 contacts with the resin sheet 11" here means such a state that the distance between the skin material 12 and the resin sheet 11 (G shown in FIG. 6) is generally about 0.1–50 mm, preferably 0.1–30 mm, especially preferably 0.1–15 mm. When the distance between the skin material 12 and the resin sheet 11 is not uniform as a whole, the distance between the portions of the skin material 12 and the resin sheet 11 which are at the closest position is employed as a standard.

In the process of the present invention, the relation between the lowering speed (mold closing speed) of the upper mold 1b and the timing and the speed of putting the sheet-holding pins 7 into the lower mold 1a is important.

When the speed of putting the sheet-holding pins 7 into the lower mold 1a is lower than the lowering speed (mold closing speed) of the upper mold 1b or when the projection length D of the sheet-holding pins 7 is too long even if the speed of putting the sheet-holding pins 7 into the lower mold 1a is higher than the lowering speed (mold closing speed) of the upper mold 1b, the resin sheet 11 is pressed to the upper mold 1b before the sheet-holding pins 7 are completely put into (return into) the lower mold 1a in the mold closing step. As a result, there is the possibility that the tips 7a of the sheet-holding pins 7 penetrate into the resin sheet 11 to make holes in the resulting molded article or the tips 7a pierce through the resin sheet 11 and contacts with the upper mold 1b to damage the driving device 8 for the sheet-holding pins 7. Therefore, the speed of putting the sheet-holding pins 7 in the lower mold 1a is equal or higher than the lowering speed of the upper mold 1b although it depends on the distance between the resin sheet 11 and the cavity faces 3a, 3b when the sheet-holding pins 7 are began to be put into the lower mold 1a. Thus, when the mold closing proceeds to such a state as the fiber-reinforced thermoplastic resin sheet 11 being pressed to the upper mold 1b, pins 7 have already been completely put in the lower mold 1a.

Figure 8:
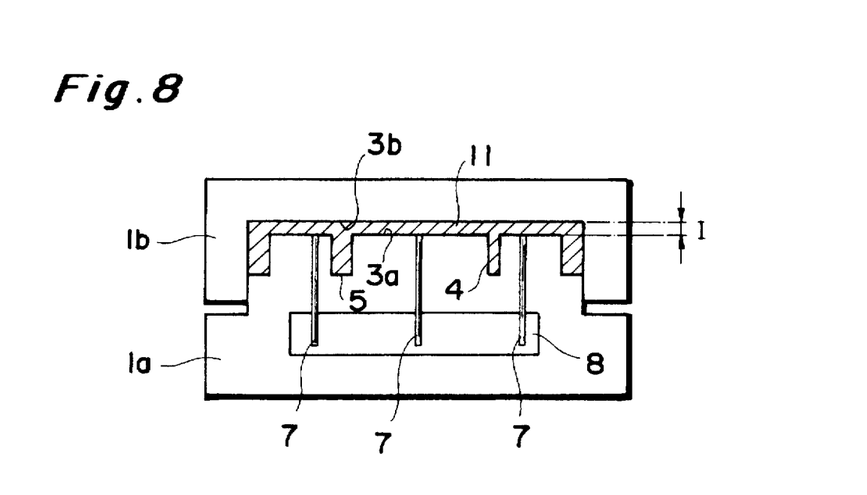

By further continuing closing of molds after the sheet-holding pins 7 have been put in the lower mold 1a as mentioned above, the heated and softened fiber-reinforced thermoplastic resin sheet 11 flows and spreads in the whole cavity between the molds and the recessions 4, 5 of the mold corresponding to the ribs or bosses of the desired molded article are also fully filled with the fiber-reinforced thermoplastic resin (shown in FIG. 8). The mold closing is carried out until the cavity clearance between the cavity faces 3a and 3b (I in FIG. 8) becomes substantially the same as the desired thickness of the molded article (final product) ($t_4$ in FIG. 3) and then the resin sheet 11 is pressed and cooled in this state (closed state).

After the resin sheet 11 has sufficiently solidified, the lower and upper molds 1a, 1b are opened ($t_5$ in FIG. 3) and the resulting fiber-reinforced thermoplastic resin molded article is removed.

The sheet-holding pins 7 can be utilized as ejector pins for removal of the article. In this case, after the lower and upper molds 1a, 1b are opened, the sheet-holding pins 7 are again projected whereby the molded article is pushed up from the cavity face 3a and can be easily released from the mold. When the sheet-holding pins 7 are utilized as ejector pins, the size of the sheet-holding pins 7 is preferably about 5–10 mm in diameter in case of the pin being columnar and, when the pin has other shapes, the size may be determined on the basis of the size of the columnar pins.

As explained above, according to the process of the present invention, it becomes possible to produce simply and efficiently a fiber-reinforced thermoplastic resin molded article excellent in surface appearance with no reinforcing fibers appearing (exposed) on the surface, without using an additional thermoplastic resin sheet for improvement of appearance and without repeating the molding processing a plurality of times, namely, by one molding processing.

Figure 9:
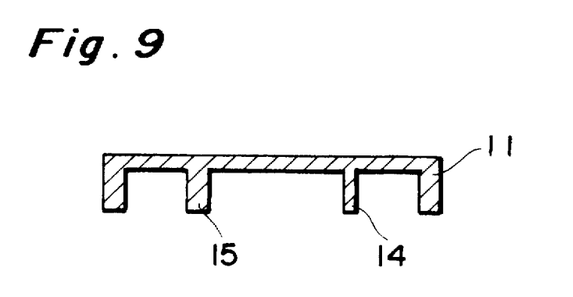
FIG. 9 is a sectional view of a fiber-reinforced thermoplastic resin molded article produced through the steps of the process of the present invention shown in FIGS. 4, 5, 7 and 8.
Figure 10:
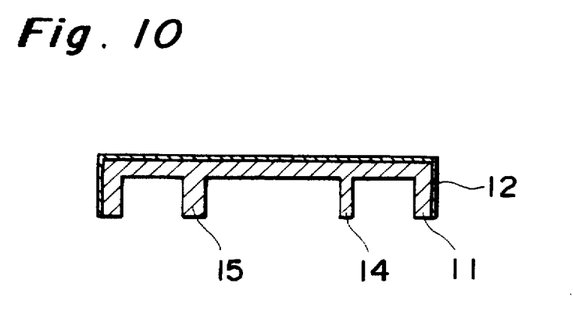
FIG. 10 is a sectional view of a fiber-reinforced thermoplastic resin molded article having a skin material produced through the step of the process of the present invention shown in FIG. 6.

Furthermore, according to the process of the present invention, it becomes also possible to produce simply and efficiently a fiber-reinforced thermoplastic resin molded article having protrusions such as rib 14 and bosses 15 as shown in FIGS. 9 and 10 which is excellent in shape and strength with the protrusions being sufficiently and uniformly filled with the reinforcing fibers and the resin, by carrying out one molding processing.

Figure 11:
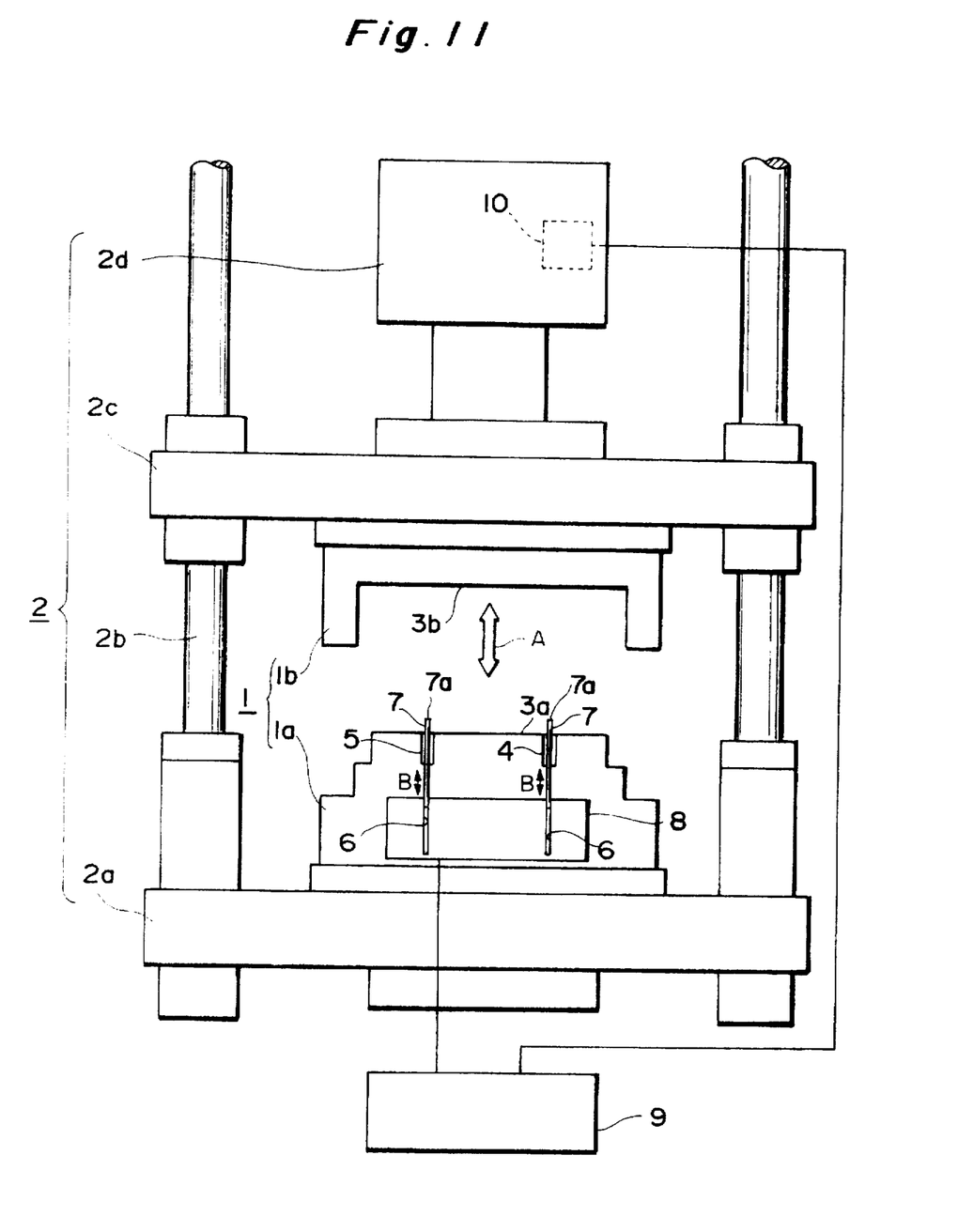
FIG. 11 is a schematic sectional view of another example of a sheet stamping mold (mold assembly) of the present invention.

In order not to make marks with the sheet-holding members 7 on the main surface of the resultant molded article having rib 14 and bosses 15, that is the surface thereof other than those of rib 14 and bosses 15, it is preferable to arrange the sheet-holding members 7 in the recessions 4, 5 of the mold corresponding to the rib 14 and/or bosses 15, as shown in FIG. 11.

The present invention will be explained in more detail by the following nonlimiting examples.

EXAMPLE 1

Figure 2:
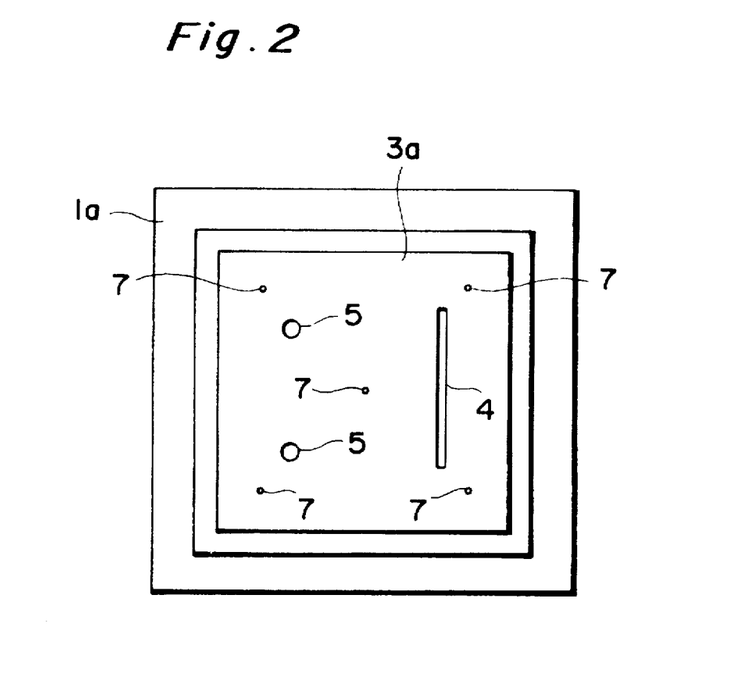
FIG. 2 is a plan view of a cavity face of the lower mold shown in FIG. 1.

A fiber-reinforced thermoplastic resin molded article having a rib and bosses as shown in FIG. 9 was produced using the mold assembly shown in FIGS. 1 and 2 by the steps shown in FIGS. 4, 5, 7 and 8 in accordance with the timing chart shown in FIG. 3.

In this example, a glass fiber-reinforced polypropylene resin sheet (thickness: 3 mm; basis weight: 3500 g/m$^2$, manufactured by K-PLASHEET Co., Ltd.) containing 40% by weight of glass fibers having a medium fiber length of 10–50 mm and made by so-called wet paper-making method was used as a fiber-reinforced thermoplastic resin sheet.

The lower mold 1a had a cavity face 3a of 400×400 mm. A groove-like recession 4 having a width of 3 mm, a length of 250 mm and a depth of 8 mm and two circular recessions 5 having a diameter of 5 mm and a depth of 8 mm were formed at the center part (main surface) of the cavity face 3a. Additionally, five holes 6 for receiving columnar sheet-holding pins 7 having a diameter of 1.5 mm were formed at five positions of center and four corners (points at a distance of 80 mm from the adjacent two sides defining the cavity face 3a) of the cavity face 3a. The upper mold 1b had a cavity face 3b corresponding to the cavity face 3a of the lower mold 1a and was connected to the driving device 2d so as to be movable up and down. The sheet-holding pins 7 were connected to hydraulic cylinder 8 provided thereunder so that they can slide through the holes 6 and project from the cavity face 3a.

First, the lower and upper molds 1a, 1b were kept at the open state and the sheet-holding pins 7 were projected towards the cavity face 3b of the upper mold 1b so that the tips 7a of the sheet-holding pins 7 were projected at a distance of 8 mm from the cavity face 3a (shown in FIG. 4).

Next, the above-mentioned glass-fiber reinforced polypropylene resin sheet 11 heated for 290 seconds in an oven set at 260° C. of atmospheric temperature to preheat the surface at 215° C. was put on the sheet-holding pins 7 (shown in FIG. 5).

Figure 7:
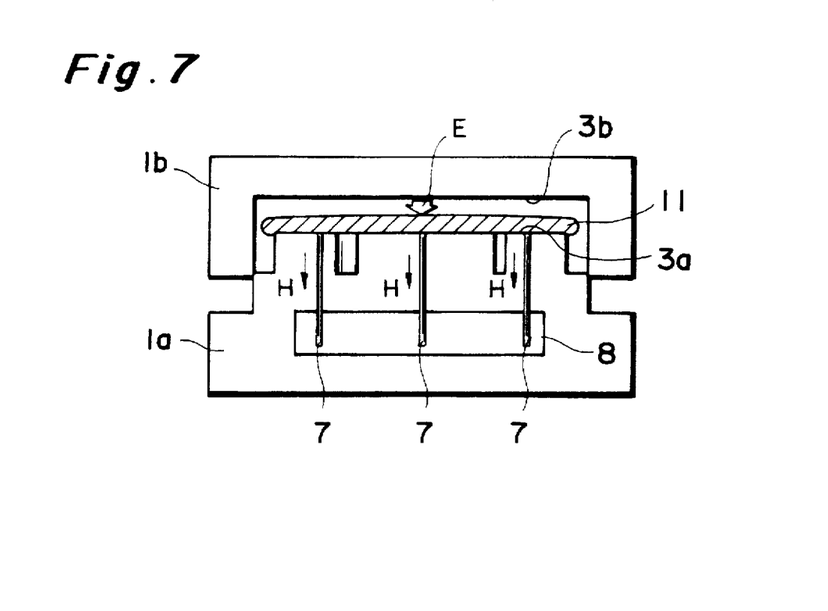

Immediately thereafter, the upper mold 1b was lowered at a speed of 20 mm/sec, and when the distance between the cavity face 3b of the upper mold 1b and the upper side surface of the glass fiber-reinforced polypropylene resin sheet 11 on the sheet-holding pin 7 provided at the center of the lower mold 1a reached 10 mm, the sheet-holding pins 7 were rapidly put into the lower mold 1a to place the sheet 11 on the cavity face 3a of the lower mold 1a (shown in FIG. 7).

The upper mold 1b was further continuously lowered to close the lower and upper molds 1a, 1b to fill the heated and softened glass fiber-reinforced polypropylene resin sheet in the cavity space (shown in FIG. 8). The sheet 11 was cooled while it was pressed under a clamping pressure of 50 tons for 90 seconds, and then the lower and upper molds 1a, 1b were opened to obtain the molded article shown in FIG. 9.

Thickness of the flat portion of the resulting molded article was 2.5 mm, and both the upper and under side surfaces of the molded article had good appearance with no glass fibers exposed on the surfaces. Moreover, the protrusions (rib 14 and bosses 15) were also sufficiently and uniformly filled with glass fibers and polypropylene resin.

EXAMPLE 2

A fiber-reinforced thermoplastic resin molded article having a skin material 12 as shown in FIG. 10 was produced using the mold assembly shown in FIGS. 1 and 2 through the step shown in FIG. 6 in accordance with the timing chart shown in FIG. 3.

That is, a polyvinyl chloride sheet 12 of 0.8 mm thick, the upper side surface of which was subjected to graining and the back side surface of which was lined with a stretch fabric was fixed and held on the parting face 13 of the upper mold 1b so that the back side surface faced the lower mold 1a and the upper side surface covered the cavity face 3b of the upper mold 1b (shown in FIG. 6).

Thereafter, the procedure of Example 1 was repeated to obtain a molded article shown in FIG. 10.

In this example, the sheet-holding pins 7 were rapidly put into the lower mold 1a when the distance between the skin material 12 held to cover the cavity face 3b of the upper mold 1b and the upper side surface of the glass fiber-reinforced polypropylene resin sheet 11 on the sheet-holding pin 7 provided at the center of the lower mold 1a reached 10 mm.

The resulting molded article had the upper side surface which had the beautiful skin material 12 having grains on the surface and the back side surface which had good appearance with no glass fibers exposed on the surface. Moreover, the protrusions (rib 14 and bosses 15) were also sufficiently and uniformly filled with glass fibers and polypropylene resin.

Comparative Example 1

A fiber-reinforced thermoplastic resin molded article was produced in the same manner as in Example 1, except that the heated and softened glass fiber-reinforced polypropylene resin sheet 11 was directly placed on the cavity face 3a of the lower mold 1a without projecting the sheet-holding pins 7 provided in the lower mold 1a and then the lower and upper molds 1a, 1b were closed. In this case, more than 10 seconds was required for the lower and upper molds 1a, 1b being in the closed state after the resin sheet 11 was placed on the cavity face 3a.

Glass fibers appeared on the surface of the resulting molded article which had been faced the lower mold 1a and the surface appearance was poor. Moreover, the protrusions (rib 14 and bosses 15) were not sufficiently filled with the glass fibers and the resin.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No.133093/1994 filed on Jun. 15, 1994 is hereby incorporated by reference.

What is claimed is:

1. A process for producing a fiber-reinforced thermoplastic resin molded article, which comprises the steps of:
   providing an upper mold and a lower mold,
   projecting a sheet-holding member provided in the lower mold from a cavity face of the lower mold towards a cavity face of the upper mold, said upper mold and said lower mold being in an open state,
   heating a fiber-reinforced thermoplastic resin sheet to form a softened fiber-reinforced thermoplastic resin sheet,
   placing the softened fiber-reinforced thermoplastic resin sheet on the sheet-holding member in such a manner that the softened fiber-reinforced thermoplastic resin sheet does not contact the cavity face of the upper mold or the cavity face of the lower mold,
   providing a skin material between the upper mold and the softened fiber-reinforced thermoplastic resin sheet, said skin material and said softened fiber-reinforced thermoplastic resin sheet each having respective upper and under side surfaces separated by a distance to prevent said skin material from being damaged by heat,
   closing the upper mold and the lower mold to provide a closed state to thereby mold together the softened fiber-reinforced thermoplastic resin sheet and the skin material to form a fiber-reinforced thermoplastic resin molded article;
   wherein, in the step of closing the upper mold and the lower mold, when a distance between a portion of the under side surface of the skin material and a portion of the upper side surface of the softened fiber-reinforced thermoplastic resin sheet reaches a distance of closest position, on the basis of said portions, in the range of 0.1 mm to 50 mm, retracting the sheet-holding member into the lower mold to lower the softened fiber-reinforced thermoplastic resin sheet onto the cavity face of the lower mold before the skin material contacts the softened fiber-reinforced thermoplastic resin sheet,
   cooling and solidifying the softened fiber-reinforced thermoplastic resin sheet while maintaining the upper mold and the lower mold in the closed state, and opening the upper mold and the lower mold and removing the fiber-reinforced thermoplastic resin molded article.

2. The process according to claim 1, further comprising a step of again projecting the sheet-holding member from the cavity face of the lower mold towards the cavity face of the upper mold after said step of opening the upper mold and the lower mold, thereby releasing the fiber-reinforced thermoplastic resin molded article from the cavity face of the lower mold.

3. The process according to claim 1, wherein a plurality of sheet-holding pins are used as the sheet-holding member.

4. The process according to claim 1, wherein, in the step of closing the upper mold and the lower mold, the sheet-holding member is retracted into the lower mold while the upper mold and the lower mold are closing, and the closed state is attained with a cavity clearance between the cavity face of the upper mold and the cavity face of the lower mold substantially corresponding to a desired thickness of the fiber-reinforced thermoplastic resin molded article.

5. The process according to claim 1, wherein the step of heating the fiber-reinforced thermoplastic resin sheet includes heating the fiber-reinforced thermoplastic resin sheet to the melting point of the resin or higher prior to said step of placing said softened fiber-reinforced thermoplastic resin sheet on the sheet-holding member.

6. The process according to claim 1, wherein the sheet-holding member is projected from the cavity face of the lower mold so that a tip of the sheet-holding member is projected at a distance of 3 mm to 15 mm from the cavity face of the lower mold.

7. The process according to claim 1, wherein when a distance between the cavity face of the upper mold and the upper side surface of the softened fiber-reinforced thermoplastic resin sheet reaches 0.1 mm to 50 mm, the sheet-holding member is retracted into the lower mold.

8. The process according to claim 1, wherein the sheet-holding member is retracted into the lower mold at a speed higher than a speed of closing the upper mold and the lower mold.

* * * * *